Figure 1:
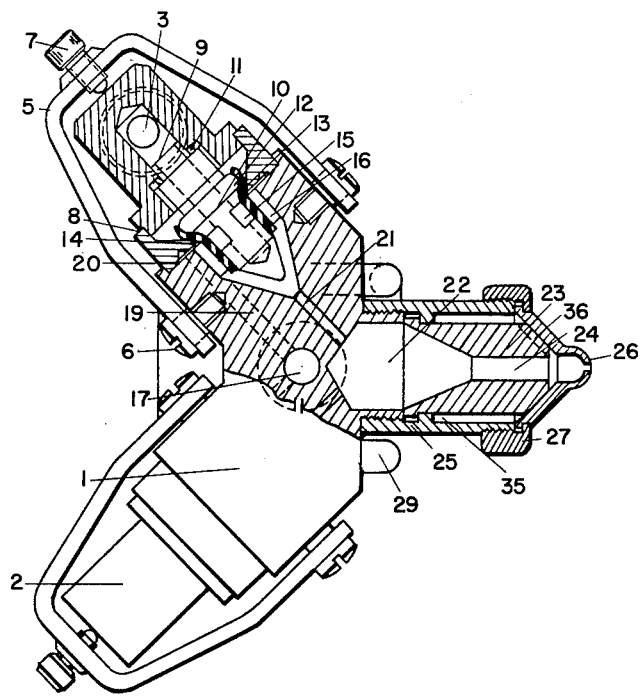

July 3, 1962 H. EDWARDS ETAL 3,042,311
SPRAY GUNS AND THE LIKE
Filed Jan. 16, 1961 2 Sheets-Sheet 1

INVENTORS
HARRY EDWARDS
JOHN ALEXANDER PARTRIDGE
NORMAN SHANKS
JOHN WILCOX
BY Cushman, Darby & Cushman
ATTORNEYS July 3, 1962    H. EDWARDS ETAL    3,042,311
SPRAY GUNS AND THE LIKE Filed Jan. 16, 1961    2 Sheets-Sheet 2

INVENTORS
HARRY EDWARDS
JOHN ALEXANDER PARTRIDGE
NORMAN SHANKS
JOHN WILCOX

BY Cushman, Darby & Cushman
ATTORNEYS

United States Patent Office 3,042,311
Patented July 3, 1962

3,042,311
SPRAY GUNS AND THE LIKE
Harry Edwards, John Alexander Partridge, Norman Shanks, and John Wilcock, all of Manchester, England, assignors to Imperial Chemical Industries Limited, London, England, a corporation of Great Britain
Filed Jan. 16, 1961, Ser. No. 83,110
Claims priority, application Great Britain Jan. 21, 1960
4 Claims. (Cl. 239—143)

This invention relates to spray guns and the like devices especially useful for the generation and placement of polyurethane foams.

It has already been proposed to generate and put in place polyurethane foams, made from polyurethane forming ingredients such as hydroxyl group-containing polyesters or polyethers and polyisocyanates, together as desired with water, catalyst, etc., for example by means of conventional multiple-feed spray guns wherein the polyisocyanate and the hydroxyl group-containing material are brought into contact at the jets of the spray gun. Mixing of the ingredients in this manner has been found to be inadequate and the resulting foam has been of too high density and poor in quality. It has also been proposed to overcome these disadvantages by the use in the spray gun of a premixing chamber fitted with a mechanical agitator.

While mechanical premixing produces satisfactory homogeneity of feed and hence good quality foams at high delivery rate, the use of a mechanical agitator has certain disadvantages. Thus the surface of the agitator may lead to a build-up of reactants, which cause blockages, and the gun or like device may require frequent cleaning. Furthermore the agitator and its drive increases the bulk and weight of the spray gun or like device which restricts its usefulness for many applications.

We have now found, that by suitable design these difficulties may be overcome and that satisfactory premixing by a stream of inert gas, preferably air, may be achieved in a premixing chamber without the use of a mechanical agitator and that, at the same time, with the aid of suitable non-return valves, the same stream of inert gas may be utilised to provide an automatic self-cleaning action which permits to operate the spray gun or like device continuously or, if desired, intermittently and prevents blockages.

Thus according to the present invention, we provide a spray gun or like device especially useful for the generation and placement of polyurethane foams comprising:

(A) a mixing chamber for the polyurethane-foam-ingredients provided with a plurality of separate inlets and an outlet;

(B) a plurality of separate introducing means for the polyurethane-foam-ingredients such as channels or tubes, each of which introducing means is fitted with a non-return valve, permitting unidirectional flow of the ingredient to the mixing chamber only and communicates, at a point downstream of the non-return valve, with a supply of inert gas and finally enters the said mixing chamber through one of the said inlets;

(C) an exit from said mixing chamber, optionally fitted with an integral or, alternatively, a detachable nozzle which, again optionally, may be surrounded by one or more means of directing a secondary controlled stream of an inert gas such as air into the path of delivery of the jet or spray emerging from the exit; and, (D) optionally, additional fittings such as handles and at least one spigot-and-recess-joint in each polyurethane-foam-ingredient introducing means, permitting ready dismantling and cleaning of the non-return valve and the introducing means.

The mixing chamber is essentially a totally enclosed cavity of a shape and size suitable to induce intense mixing and so small that the residence time of the ingredients in it is extremely short, preferably of the order of $\frac{1}{10000}$ to $\frac{1}{10}$ second. The chamber may be provided with baffles or grooves to enhance mixing; because of ease of construction and cleaning, a cavity of simple symmetrical shape with smooth, plain surfaces is preferred such as a spherical, ellipsoid, cylindrical or conical cavity or a cavity formed by combination of these shapes, which opens into the exit or nozzle of the mixing chamber. Each polyurethane-foam-ingredient introducing means comprises three sections. The first section is a channel or duct or tube through which one or more ingredients usually in a single liquid phase are fed from a metering pump; the second section comprises (1) a non-return valve, conveniently positioned in a widened section of the introducing means, permitting unidirectional flow of ingredient only and preventing the entry of air or mixed ingredients into the first section of the polyurethane-foam-ingredient introducing means in case of blockages, and (2) inert gas introducing means communicating with the ingredient introducing means at a point downstream of the non-return valve, and (3) a pre-mixing channel, conveniently an annular space, surrounding the outlet from the non-return valve and gradually tapering off towards the third section, in which pre-mixing channel the ingredient is mixed and dispersed in the stream of inert gas. The third section is the connection between the pre-mixing channel and the chamber, usually a tube or channel of smaller, uniform diameter resulting in a high flow-velocity of the pre-mix of ingredient and inert gas.

The exit from the mixing chamber is provided at the opposite end of the mixing chamber to the inlets. For the spray gun modification of the invention the spray pattern of the jet of the mixture of inert gas and the ingredients may be in the approximate shape of a diverging cone as used in normal spray guns and may be modified in a known manner by suitable choice of dimensions of the exit or by use of a suitable nozzle, which may either be integral with the exit or detachable, by means of a thread or by means of a spigot-and-recess joint clamped on by a screw or cam device. One or more additional supply lines of inert gas may be provided and arranged in such a manner that a stream of inert gas emerging from them surrounds the jet or spray flowing from the exit and modifies the spray pattern and the size of the mist.

The main supply of inert gas is conveniently connected to a central duct, channel or tube inside the body of the spray gun and the individual supply lines to the polyurethane-foam-ingredient introducing means and optionally the inert gas supply to the exit are branched off from this central duct.

Two polyurethane-foam-ingredient introducing means and inlets are normally sufficient when the spray gun or the like is used for polyurethane foam. The polyisocyanate is usually fed to one inlet and the remaining ingredients are fed as a pre-mix to the other inlet. If desired, further inlets may be provided, for example, for the additional incorporation of chopped glass-fibre.

Figure 2:
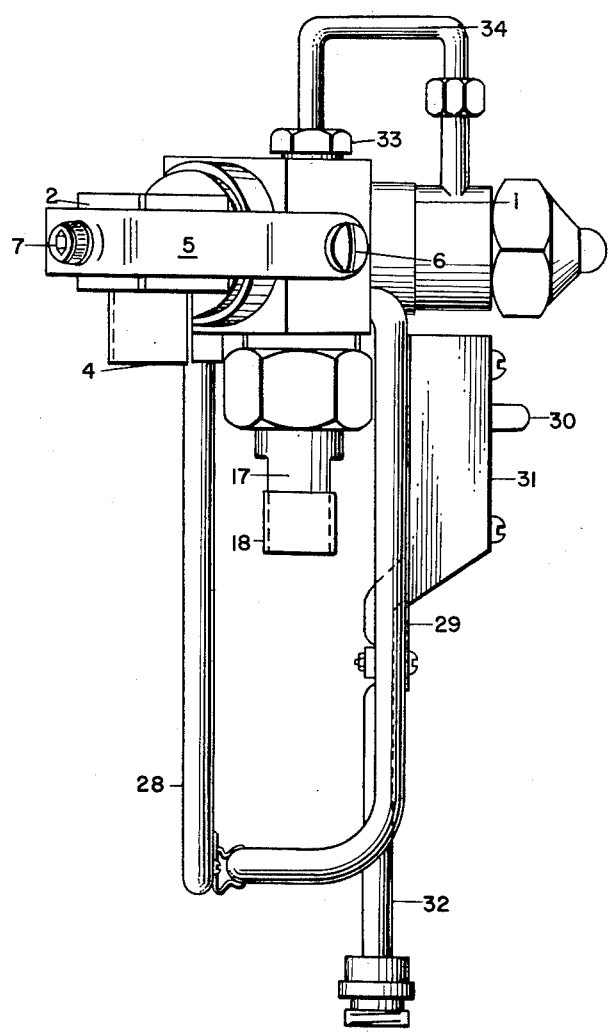

The invention may now be illustrated with reference to a preferred embodiment shown in the accompanying drawings, wherein FIGURE 1 is a view of a spray gun with one of two identical polyurethane-foam-ingredient introducing means and the mixing chamber and exit shown in cross section and FIGURE 2 is a side elevation of the same spray gun.

In the drawings, 1 is the body of the spray gun, 2 is a detachable elbow of the polyurethane-foam-ingredient introducing channel 3 (FIG. 1) to the inlet 4 (FIG. 2) of which the polyurethane-ingredient supply line from the metering equipment is coupled. The elbow 2 is fastened to the body 1 by means of a clamp 5 which is screwed into the body 1 by two pivots 6 and provides for compression of the elbow by means of setting screw 7. The elbow 2 is recessed into the detachable ring 8, which in turn is recessed into the body 1. Into the outlet 9 from the elbow 2 the tubular end of the non-return valve 10 is inserted in a sliding fit and sealed by means of the compressible rubber gasket 11. A collar 12 on the non-return valve 10 which is covered with a sleeve 13 of rubber tubing presses against the conical internal flange 14 of ring 8, thus providing both a seal and centering of the valve. Through the broadened tube of the non-return valve below the collar 12 two slots 15 are milled at a right angle to the axis of the valve thus permitting polyurethane-foam-ingredient passing through the hollow stem of the valve to expand the rubber of sleeve 13 and to squirt into premixing channel 16 which essentially consists of a cavity of a cylindrical top section and a conical bottom section. The outside of the part of the non-return valve which is inserted into the premixing channel 16 also has a roughly cylindrical shape with a conical end, both cylinder and cone being of smaller dimensions than the cavity and thus leaving an annular premixing channel between body and valve. The main supply of inert gas, usually air, to the spray gun is coupled to the main air channel 17 by means of coupling 18 (FIG. 2). From channel 17 a tubular duct 19 supplies air to an annular gap 20 between the underside of ring 18 and the body 1, which annulus communicates with the annular cylindrical mixing channel 16, thus permitting entry of air and mixing with the polyurethane ingredient. The annular mixing channel tapers off into the tubular inlet 21 entering the mixing chamber 22. The mixing chamber 22 is a single cavity formed by a first hollow conical section, into which the two inlet channels 21 for the ingredients enter, a hollow cylindrical central section, and a second truncated conical section the apex of which is replaced by the exit channel 24 of the nozzle 23. In the embodiment of the invention shown in FIGURES 1 and 2 the second hollow cone of the mixing chamber is formed by a recess in the nozzle 23 which is attached to the body 1 in a face-to-face joint by means of a threaded, tubular coupling 25. A conventional detachable air cap 26 is screwed on by means of an external thread retaining nut 27. Between the tubular coupling 25 and the body of nozzle 23 an annular space 35 is formed which is connected to the main air channel 17 by means of tubing 34 (FIG. 2) and from which a number of outlet channels 36 are provided to the air cap 26. Use of the secondary air supply to the air cap 26 is optional; for control of air flow a needle valve, not shown in the drawing, may be mounted in tube 34 (FIG. 2). When use of the secondary air is not desired the cap 26 is removed by unscrewing retaining nut 27. Nozzles of varying sizes and shapes may be mounted in place of nozzle 23. A back handle 28 (FIG. 2) and front handle 29 are provided to which latter the switches 30 (FIG. 2) for operation of the metering pumps and the air supply, the switch cover 31 (FIG. 2) and the electrical flex 32 (FIG. 2) are mounted. A detachable screwed-in plug 33 (FIG. 2) in a tubular cavity connected to the main air channel 17 (FIG. 1) is provided to permit insertion of a branched-off air line for inspection and cleaning.

When the spray gun described above is used for the manufacture of polyurethane foam, polyisocyanate is introduced into one elbow 3 through entry 4 and the polyhydroxy compound and other optional ingredients, carefully mixed, are introduced into the elbow 2 in the same manner. Both ingredients flow through the elbow, the tubular cavity 9 in the non-return valve (FIG. 1) and squirt from holes 15 passing between the rubber sleeve 13 and the body of the valve into the annular mixing channel 16. Air is admitted simultaneously to the main channel 17, fed from there through tubular ducts 19 into annular gaps 20 (FIG. 1) and the annular premixing channel 16. Both dispersions of ingredients in air pass through channels 21 into the mixing chamber 22 where they meet and are rapidly mixed. The mixture of polyurethane foam ingredients and air leave the gun through channel 24 of nozzle 23 and the slit of air cap 26. Air from the copper tube 34 (FIG. 2) controlled by means of a needle valve (not shown in sketch) provides a further variable degree of dispersion.

When the flow of ingredients is shut off and air flow is permitted to continue for some time the non-return valve closes automatically and the air clears the passages from the annular mixing channel onward to the exit. In the same way, if a blockage develops, the build-up of pressure in the nozzle closes first the non-return valve and, under back-pressure, spraying ceases. For some time the air flow however continues until the pressure drop caused by the blockage approaches the pressure available from the air supply. Frequently this is sufficient to clear the blockage and revert automatically to normal operation.

The polyurethane foam applied in the mannner described above is of superior texture and of lower density than similar material applied using a conventional multiple feed spray gun. The smaller bulk and weight of the gun broaden the field of its application and give greater ease of use. The automatic closure of the polyurethane-foam-ingredient feed lines under back pressure very considerably reduces the occurrence of blockages and air provides automatic self-cleaning when the supply of ingredients is shut off thus permitting intermittent operation without loss of time owing to blockages or cleaning. Furthermore during the spraying operation there is an outstanding freedom from free isocyanate or from polyester or polyether entering the atmosphere surrounding the operation of the spray gun.

The spray gun may also be used with other reactive materials which require thorough mixing.

Although the description of the invention is particularly directed to spray guns the invention is also applicable to the dispensing apparatus used for supplying a mixture of polyurethane foam forming ingredients for generation of the foam in situ in a mould, cavity or the like. Whether the invention is used in connection with a spray gun or a dispensing apparatus it may be advantageously employed together with means for metering the foam-forming ingredients supplied to the spray gun or dispensing apparatus in predetermined proportion. Suitable metering and control means for supplying the foam-forming ingredients in predetermined proportion is for example that described in Belgian Patent No. 582,239.

When the present invention is directed to dispensing apparatus the design of the dispensing head i.e. that part of the dispensing apparatus concerned with mixing and delivering the foam-forming ingredients to the cavity or mould differs somewhat from the spray-gun variant. Thus the nozzle of the dispensing head from which the mixed foam-forming ingredients are delivered may be in the form of a simple hollow tube directly joined to the mixing chamber and the secondary auxiliary supply of air which in the spray gun variant can be introduced directly into the mixed ingredients after they emerge from the mixing chamber is dispensed with. In operating the dispensing apparatus a reduced air flow is usually employed compared with that employed with the spray gun. This is by reason of the fact that the delivery nozzle of the dispensing head is of wider diameter than the spray nozzle and there is no appreciable build up of back pressure. However, when delivery of the foam-forming ingredients is shut off means must then be provided to increase the quantity of air supplied to the dispensing head in order that no appreciable residue of the mixture of reactive chemicals is left in the mixing chamber or other parts of the apparatus. The air supply may be increased by manual operation of a suitable placed valve in the air line or automatically by coupling the valve for example through an arrangement of solenoids and relays to the metering means for the foam-forming ingredients so that when supply of these ingredients to the mixing chamber is cut off the air supply is automatically increased until dispensing is recommenced.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What we claim is:

1. Apparatus for generating and dispensing polyurethane foam-forming mixtures and the like comprising: a housing having a mixing chamber, at least two inlet passages leading to said mixing chamber for introducing separate ingredients into said mixing chamber, and an outlet passage for dispensing foam-forming mixture from said mixing chamber; a non-return valve disposed in each of said inlet passages, providing unidirectional flow of an ingredient therethrough; said housing also including a pre-mixing chamber in each of said inlet passages between said non-return valves, and said mixing chamber; and inert gas supply passage means communicating with each of said pre-mixing chambers, whereby separate ingredients, introduced into each of said inlet passages, are individually mixed with an inert gas in said pre-mixing chambers prior to entering said mixing chamber for combining the same.

2. Apparatus defined in claim 1 including a nozzle secured to said housing in the path of said outlet passage.

3. Apparatus defined in claim 2, including means for directing a secondary stream of inert gas in the foam-forming mixture leaving said housing via said outlet passage.

4. Apparatus defined in claim 1 including barrels detachably joined to said housing and having said inlet passages formed therein, said barrels being secured to said housing by a spigot and recess joint.

References Cited in the file of this patent

UNITED STATES PATENTS

| | | |
|---|---|---|
| 1,321,014 | Day | Nov. 4, 1919 |
| 1,608,833 | Birkenmaier et al. | Nov. 30, 1926 |
| 1,657,395 | Held | Jan. 24, 1928 |
| 1,873,398 | Hansen | Aug. 23, 1932 |
| 2,262,964 | Reilly et al. | Nov. 18, 1941 |
| 2,724,615 | Ariotti | Nov. 22, 1955 |
| 2,754,153 | Barthod | July 10, 1956 |
| 2,933,125 | Anderson | Apr. 19, 1960 |
| 2,992,194 | Paulsen | July 11, 1961 |